United States Patent
Pilutti et al.

(10) Patent No.: US 9,511,764 B2
(45) Date of Patent: Dec. 6, 2016

(54) SEMI-AUTONOMOUS MODE CONTROL

(71) Applicant: Ford Global Technologies, LLC, Dearborn, MI (US)

(72) Inventors: Thomas Edward Pilutti, Ann Arbor, MI (US); Matthew Y. Rupp, Canton, MI (US); Roger Arnold Trombley, Ann Arbor, MI (US); Andrew Waldis, Orion Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/193,364

(22) Filed: Feb. 28, 2014

(65) Prior Publication Data
US 2015/0246672 A1    Sep. 3, 2015

(51) Int. Cl.
| | |
|---|---|
| *B60T 7/12* | (2006.01) |
| *G05D 1/00* | (2006.01) |
| *G06F 7/00* | (2006.01) |
| *B60W 30/00* | (2006.01) |
| *B60W 50/00* | (2006.01) |
| *G08G 1/00* | (2006.01) |

(52) U.S. Cl.
CPC ........ *B60W 30/00* (2013.01); *B60W 2050/008* (2013.01); *G08G 1/22* (2013.01)

(58) Field of Classification Search
CPC ........... G08G 1/20; G08G 1/22; G01S 5/0072; B60W 2050/008; B60W 30/00
USPC .............................. 701/2, 422, 29.3, 482, 96
See application file for complete search history.

(56) References Cited

U.S. PATENT DOCUMENTS

| | | | |
|---|---|---|---|
| 7,292,940 B2* | 11/2007 | Isogai | ................... B60T 17/221 340/436 |
| 8,352,112 B2 | 1/2013 | Mudalige | |
| 8,849,494 B1 | 9/2014 | Herbach et al. | |
| 8,880,272 B1 | 11/2014 | Ferguson et al. | |
| 8,880,273 B1 | 11/2014 | Chatham | |
| 2005/0012602 A1 | 1/2005 | Knoop et al. | |
| 2007/0233337 A1 | 10/2007 | Plishner | |
| 2009/0079839 A1 | 3/2009 | Fischer et al. | |
| 2010/0063680 A1 | 3/2010 | Tolstedt et al. | |
| 2011/0184605 A1 | 7/2011 | Neff | |
| 2012/0083960 A1 | 4/2012 | Zhu et al. | |
| 2012/0271489 A1 | 10/2012 | Roberts et al. | |

(Continued)

FOREIGN PATENT DOCUMENTS

| | | | |
|---|---|---|---|
| JP | 2010003242 A | * | 1/2010 |
| WO | WO 2012050486 | | 4/2012 |

OTHER PUBLICATIONS

FCC DSRC document: https://transition.fcc.gov/Bureaus/Engineering_Technology/News_Releases/1999/nret9006.html.*

(Continued)

*Primary Examiner* — Isaac Smith
(74) *Attorney, Agent, or Firm* — Frank MacKenzie; Bejin Bieneman PLC

(57) ABSTRACT

A first vehicle may receive at least one message from a second vehicle, the message including data provided by the second vehicle. A computing device in the first vehicle is configured to analyze the data of the at least one message to determine that the second vehicle can operate as a lead vehicle. The computing device in the first vehicle is further configured to implement at least one operation in the first vehicle according to the data from the lead vehicle.

20 Claims, 3 Drawing Sheets

(56) References Cited

U.S. PATENT DOCUMENTS

| | | | |
|---|---|---|---|
| 2013/0015984 A1* | 1/2013 | Yamashiro | G08G 1/22 340/988 |
| 2013/0030606 A1 | 1/2013 | Mudalige et al. | |
| 2013/0041576 A1 | 2/2013 | Switkes et al. | |
| 2013/0310067 A1 | 11/2013 | Nakata et al. | |
| 2013/0318214 A1 | 11/2013 | Tebay et al. | |
| 2015/0102955 A1* | 4/2015 | O'Dea | G01S 7/41 342/70 |

OTHER PUBLICATIONS

Ploeg et al., "Connect & Drive: design and evaluation of cooperative adaptive cruise control for congestion reduction", Journal of Modern Transportation. vol. 19, No. 3, Sep. 2011, pp. 207-213.

Davis et al., "Evaluation of Semi-Autonomous Convoy Driving", Journal of Field Robotics 25 (11-12), 880-897 (2008)—published 2008 Wiley Periodicals, Inc.

* cited by examiner

SEMI-AUTONOMOUS MODE CONTROL

BACKGROUND

A vehicle, particularly a vehicle being operated autonomously or semi-autonomously, may obtain data concerning surrounding conditions via a variety of mechanisms, e.g., sensors or the like included in the vehicle. Sensor data can provide information concerning environmental conditions, edges of a road or lanes in a road, etc., and can be used to formulate an appropriate speed for a vehicle, an appropriate path for a vehicle, etc. However, a vehicle may lack some or all sensors needed to provide data for operating a vehicle autonomously or semi-autonomously, or such sensors may be limited or disabled.

DRAWINGS

DESCRIPTION

Introduction

Figure 1:
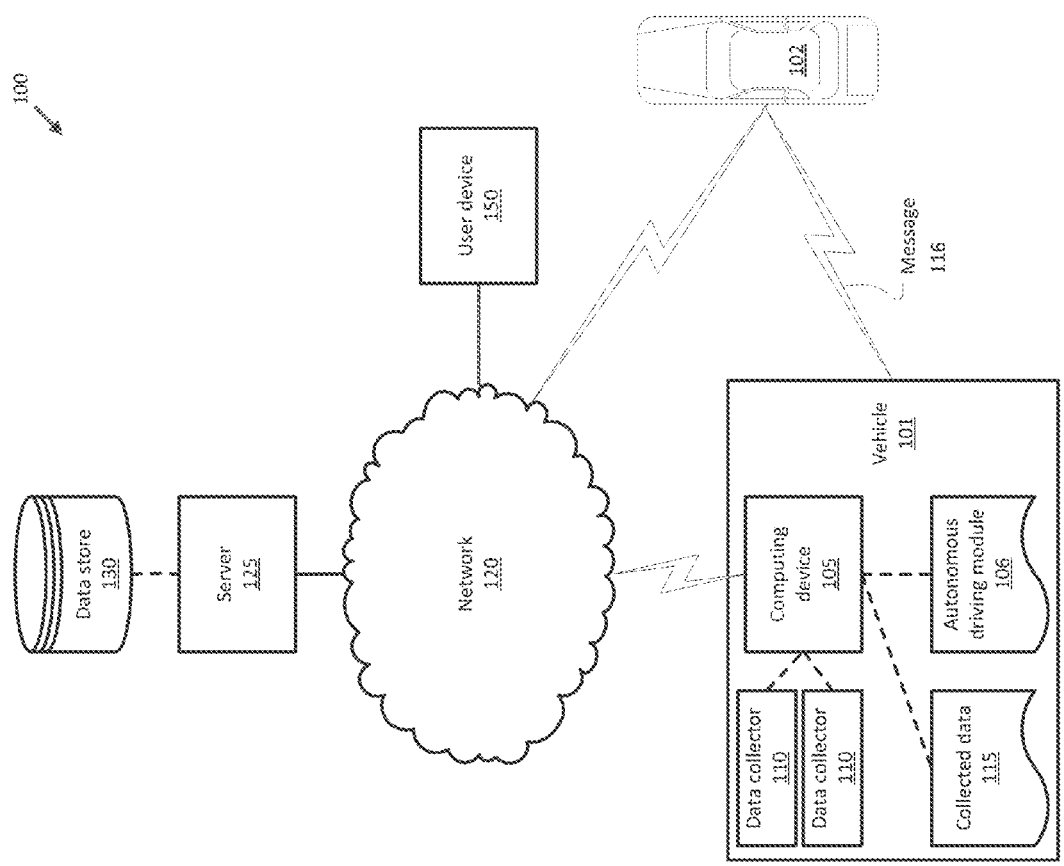
FIG. 1 is a block diagram of an exemplary autonomous vehicle sensing system.

FIG. 1 is a block diagram of an exemplary autonomous vehicle system 100 including at least first and second vehicles 101, 102. A computing device 105 in a first vehicle 101 generally receives collected data 115 from one or more data collectors 110 and/or from a second vehicle 102 via one or more messages 116. The computing device 105 further includes an autonomous driving module 106, e.g., as a set of instructions stored in a memory of, and executable by a processor of, the computing device 105. The collected data 115 from the first vehicle 101 and/or from a second vehicle 102 may be used by the first vehicle 101 computer 105 to make determinations concerning first vehicle 101 operations, including operations of the first vehicle 101 in a semi-autonomous mode, i.e., to perform one or more selected operations, such as maintaining speed, maintaining or changing lanes, maintaining a distance from another vehicle, adjusting a suspension setting to accommodate a predicted rougher or smoother road surface, etc.

The second vehicle 102, which provides the messages 116 to the first vehicle 101, may be provided with a more sophisticated computer 105 and/or module 106, a fuller and more robust set of data collectors 110, etc., than the first vehicle 101. For example, the second vehicle 102 could include multiple lidar sensors 110, one or more 360 degree camera data collectors 110, one or more 360 degree radar data collectors 110, etc. On the other hand, a first vehicle 101 following a second vehicle 102 could include a subset of less than all sensor data collectors 110 included on a second vehicle 102 providing data 115 in messages 116 to the first vehicle 101. For example, a first vehicle 101 could be capable of semi-autonomous operations such as adaptive cruise control, lane-keeping assist, and/or collision-avoidance breaking, but not full autonomous operations. By providing data 115 in messages 116, the second vehicle 102 could provide information to the first vehicle 101 whereby the first vehicle 101 will obtain data 115 relating to other vehicles 101, 102, objects in a roadway, etc., that the first vehicle 101, generally possessing a more limited set of sensor data collectors 110 than a second vehicle 102, would not otherwise be able to obtain.

Exemplary System Elements

A vehicle 101, 102 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select an autonomous operation mode, to adjust an autonomous operation mode, to change an autonomous operation mode, etc., of the vehicle 101, 102. In general, a vehicle 101, 102 may be capable of at least partial or semi-autonomous operations, i.e., performing at least certain operations such as adaptive cruise control, lane-keeping, etc., without intervention from a human operator.

Moreover, vehicles 101, 102 are labeled separately to reflect potentially different capabilities. That is, as mentioned above, a vehicle 102 generally possesses a robust set of data collectors 110 and autonomous module 106 capable of conducting full autonomous operations, or at least autonomous operations more fully than a vehicle 101. Further, a computer 105 in a lead vehicle 102 may be configured to provide messages 116 to one or more second vehicles 101. A computer 105 in a first lead vehicle 102 may likewise be configured to receive messages 116 from a second lead vehicle 102, whereas a following vehicle 101 is generally not configured to provide messages 116 including collected data 115 (although the following vehicle 101 may provide DSRC messages or the like such as discussed below), because a following vehicle 101 generally lacks a robust set of data collectors 110 and/or data 115 that would be useful to other vehicles 101, 102. Note that a vehicle 102 may be referred to as a "lead" vehicle, even if the vehicle 102 is not physically in front of a "following" vehicle 101, 102, and likewise a following vehicle 101, 102 may not be physically to the rear of a lead vehicle 102.

Further, the computer 105 may include more than one computing device. For example, operations ascribed herein to the computer 105 may be carried out by one or more computing devices, e.g., controllers or the like included in the vehicle 101 for monitoring and/or controlling various vehicle components, e.g., an engine control unit (ECU), transmission control unit (TCU), Power Steering Control Unit (PSCU), brake controller (often regarded as the most important control on an autonomous or semi-autonomous vehicle 101), etc.

The computer 105 is generally configured for communications on a controller area network (CAN) bus or the like. The computer 105 may also have a connection to an onboard diagnostics connector (OBD-II), or can be hardwired to specific driver control interfaces or subsystem ECU I/O (input/output). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may include or be communicatively coupled to, one or more radio frequency (RF) cellular, microwave, etc., transceivers, receivers, and/or transmitters, and may be configured for communicating with the network 120 and/or other vehicles 101. For example, a computer 105 is generally configured for sending and receiving messages 116 (described further below) to and from other vehicles 101. Various technologies, including hardware, communication protocols, etc., are known for vehicle-to-vehicle communications. For example, messages 116 as described herein could be sent and received at least in part according to Dedicated Short Range Communications (DSRC) or the like. As is known, DSRC communications are relatively low-power operating over a short to medium range in a spectrum specially allocated by the United States government in the 5.9 GHz band. Moreover, as discussed in more detail below, messages 116 generally include data 115 not explicitly provided for in an existing specification such as DSRC.

In general, communications of a vehicle 101, 102 computer 105 may include various wired and/or wireless networking technologies, e.g., cellular, Bluetooth, wired and/or wireless packet networks, etc. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc. In addition, the computer 105 generally is configured to retrieve data concerning one or more other vehicles 102 from one or more messages 116.

Generally included in instructions stored in and executed by the computer 105 is an autonomous driving module 106. Using data 115 received in the computer 105, e.g., from data collectors 110 or in a message 116, etc., as well as possibly data received from the server 125, the module 106 may control various vehicle 101, 102 components and/or operations without a driver to perform or control one or more operations of the vehicle 101, 102, i.e., the vehicle 101, 102 may operate in a semi-autonomous mode. For example, the module 106 may be used to regulate vehicle 101, 102 speed, acceleration, deceleration, steering, distance between vehicles and/or amount of time between vehicles, lane-change minimum gap between vehicles, left-turn-across-path minimum, time-to-arrival, intersection (without signal) minimum time-to-arrival to cross the intersection, lane guidance information, safe emergency exit path, adjustments to a vehicle 101 suspension in anticipation of a changed road condition, etc.

Data collectors 110 may include a variety of devices. For example, various controllers in a vehicle may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like, e.g., medium-range and long-range sensors, for detecting, and possibly also obtaining information from, objects 160, e.g., as described further below, as well as other conditions outside the vehicle 101. For example, sensor data collectors 110 could include mechanisms such as radios, RADAR, lidar, sonar, cameras or other image capture devices, that could be deployed to detect objects 160 and/or obtain other collected data 115 relevant to autonomous operation of the vehicle 101, e.g., measure a distance between the vehicle 101 and other vehicles or objects, to detect other vehicles or objects 160 and locations and/or trajectories of same, and/or to detect road conditions, such as curves, potholes, dips, bumps, changes in road grade, obtain information from road signs, etc.

A memory of the computer 105 generally stores collected data 115. Collected data 115 may include a variety of data collected in a vehicle 101 from data collectors 110, including data 115 obtained from one or more objects 160. Examples of collected data 115 are provided above and below, e.g., with respect to objects 160, and moreover, data 115 may additionally include data calculated therefrom in the computer 105. In general, collected data 115 may include any data that may be gathered by a collection device 110 and/or computed from such data. Accordingly, collected data 115 could include a variety of data 115 related to vehicle 101 operations and/or performance, as well as data related to in particular relating to motion of the vehicle 101. For example, in addition to data 115 obtained from an object 160 such as discussed below, collected data 115 could include data concerning a vehicle 101 speed, acceleration, braking, lane changes and or lane usage (e.g., on particular roads and/or types of roads such as interstate highways), average distances from other vehicles at respective speeds or ranges of speeds, smoothness or roughness of a roadway 155, roadway 155 friction, and/or other data 115 relating to vehicle 101 operation.

A message 116 may include a variety of data concerning operations of a vehicle 101. For example, a current specification for DSRC, promulgated by the Society of Automotive Engineers, provides for including a wide variety of vehicle 101 data in a message 116, including vehicle 101 position (e.g., latitude and longitude), speed, heading, acceleration status, brake system status, transmission status, steering wheel position, etc. However, messages 116 are not limited to data elements included in the DSRC standard, or any other standard. For example, a message 116 could actually include a communication according to DSRC as well as a supplemental or augmented communication, and in any case can include a wide variety of collected data 115 obtained from a vehicle 101 data collectors 110, such as camera images, radar or lidar data, data from infrared sensors, location data, e.g., latitude and longitude geo-coordinates acquired according to the Global Positioning System (GPS), ultrasonic information, trajectory information (vehicle heading, speed, etc.), etc. Accordingly, a first vehicle 101 could receive collected data 115 from a second vehicle 101, whereby the first vehicle 101 computer 105 could use the collected data 115 from the second vehicle 101 as input to the autonomous module 106 in the first vehicle 101, i.e., to determine one or more semi-autonomous operations of the first vehicle 101.

The network 120, as mentioned above, represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 received from one or more vehicles 101.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, a known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Exemplary Environment

Figure 2:
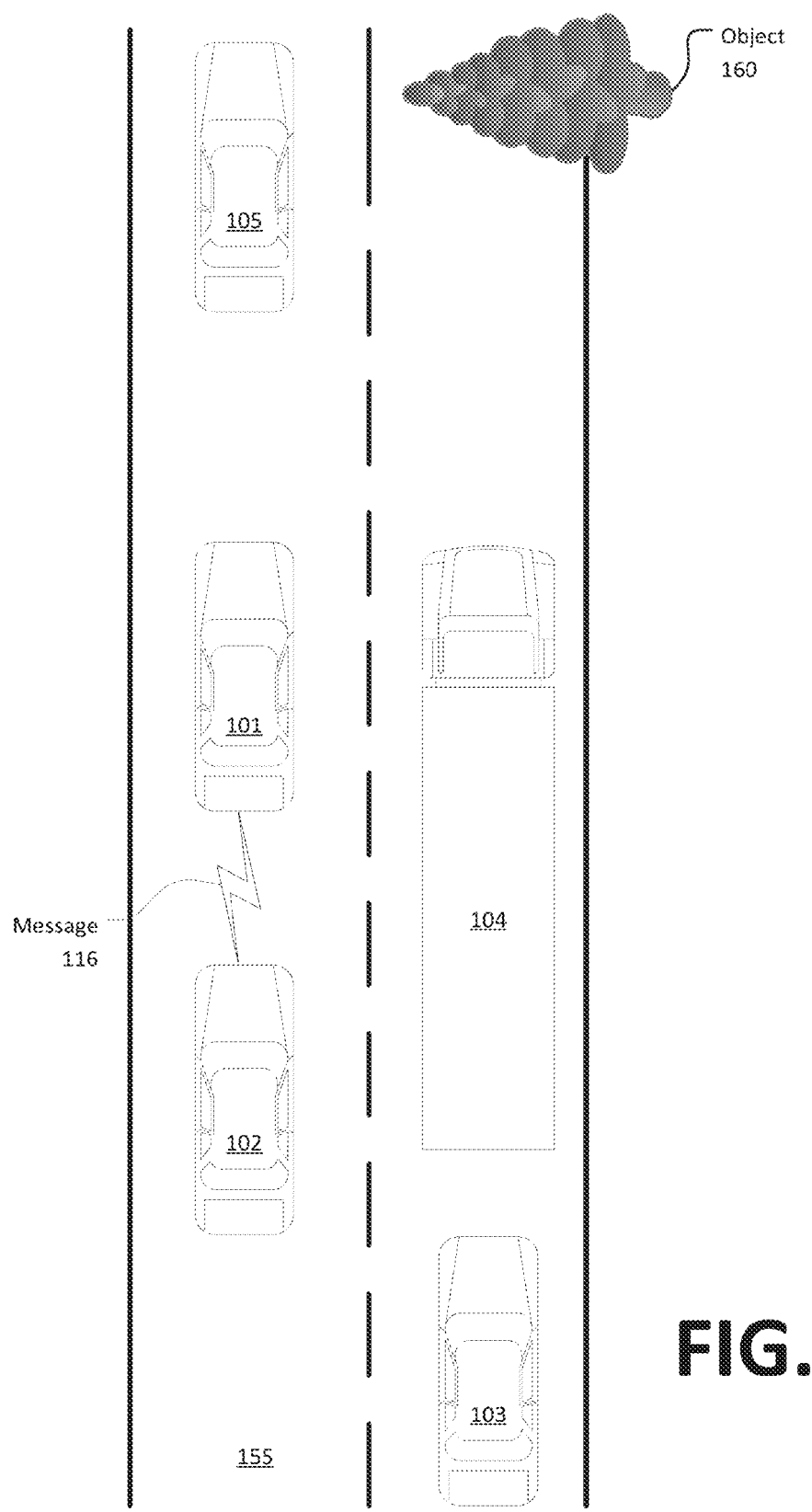
FIG. 2 is a block diagram of a vehicle roadway including multiple vehicles.

FIG. 2 is a block diagram of a roadway 155 being traversed by a plurality of vehicles 101, 102, 103, 104, and 105. In general, as discussed above, the various vehicles 101 may use data collectors 110 to obtain various collected data 115, and to communicate various collected data 115 to other vehicles 101 via one or more messages 116. In the example of FIG. 2, a first vehicle 102 receives messages 116 from a second vehicle 101, whereby the vehicle 102 may use data 115 from the vehicle 101 to perform one or more operations, and accordingly whereby the first vehicle 102 is operated semi-autonomously according to data 115 in one or more messages 116 from the second vehicle 101.

For example, the first vehicle 102 may include, in the module 106, instructions for processing certain types of data 115, e.g., lidar, radar, etc. However, the first vehicle 102 may not include data collectors 110, e.g., lidar sensors, radar sensors, etc., for obtaining a type of collected data 115, e.g., radar, lidar, etc., collected data 115. Accordingly, a message 116 from a second vehicle 101 may provide such collected data 115 to the first vehicle 102 to allow the first vehicle 102 to perform at least one autonomous operation that the first vehicle 102 could not otherwise perform. For example, the first vehicle 102 could use radar or lidar data 115 from the second vehicle 101 to detect an object 160, measure a distance, speed, etc., of the object 160, on or near the roadway 155, where such detection and/or measurement may not otherwise be possible for the computer 105 in the first vehicle 102. Moreover, multiple items of data 115 in one or more messages 116 could be used together. For example, radar or lidar data 115 from a second vehicle 101 generally would require a speed and location of the second vehicle 101.

Exemplary Process Flow

Figure 3:
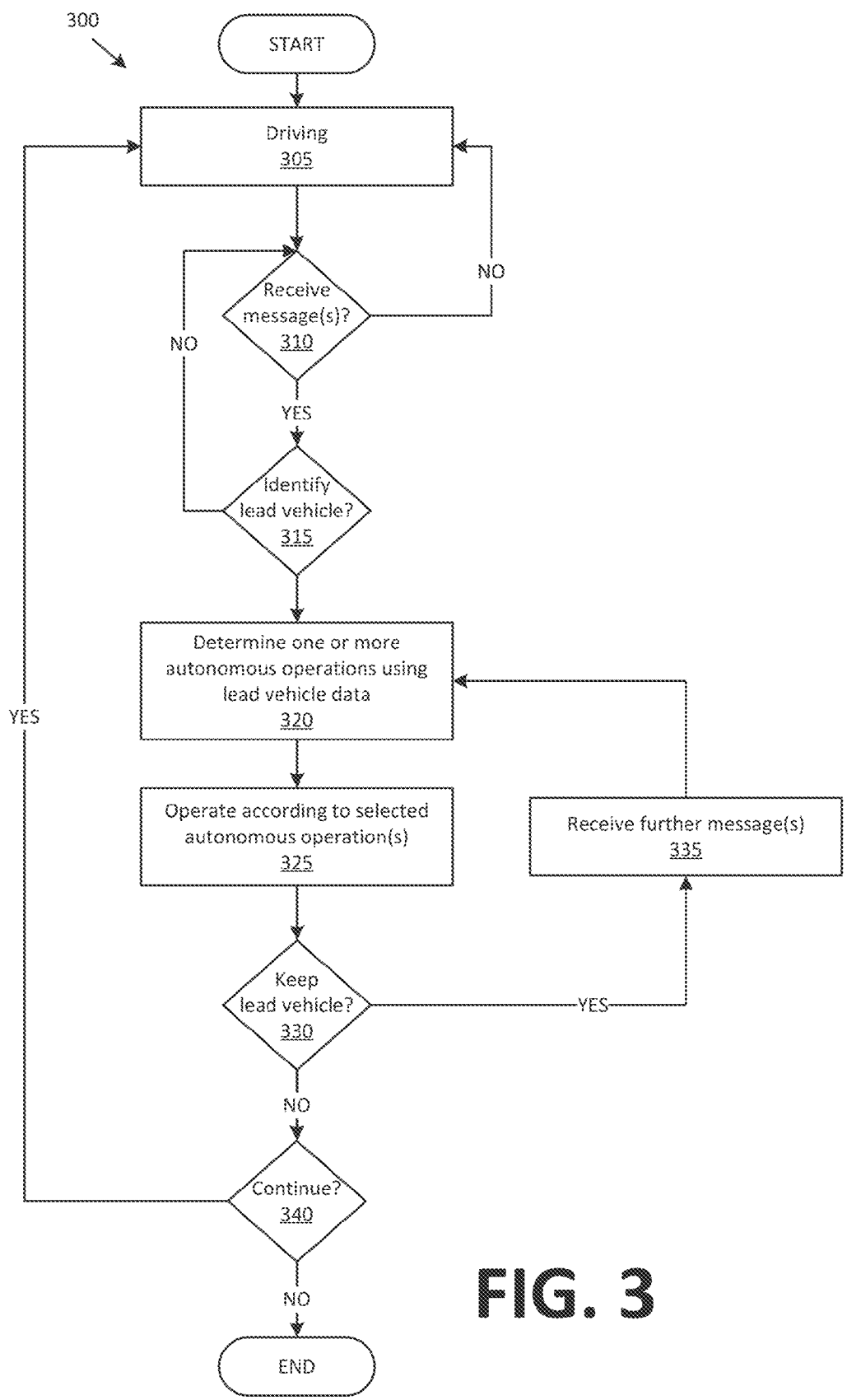
FIG. 3 is a diagram of an exemplary process for an autonomous vehicle to obtain and use data from a second autonomous vehicle.

FIG. 3 is a diagram of an exemplary process for an autonomous vehicle 101 to obtain and use data from a second autonomous vehicle 102, the process 300 generally carried out according to instructions in a first vehicle 101 computer 105 and/or second vehicle 102 computer 105, as described in more detail below. In general, the first vehicle 101, as mentioned above, may not include a fully robust or complete set of data collectors 110, i.e., may be capable of limited or semi-autonomous operation. However, data 115 provided by a second vehicle 102 may allow the first vehicle 101 to conduct autonomous operations of which it would not otherwise be capable, and/or to obtain data 115, e.g., providing warning or information about a condition, hazard, etc., that the first vehicle 101 data collectors 110 would not otherwise be able to obtain.

The process 300 begins in a block 305, in which a first vehicle 101 conducts driving operations. That is, the vehicle 101 is operated manually or perhaps semi-autonomously, e.g., with some or all vehicle 101 operations performed according to inputs (e.g., turning a steering wheel, depressing a brake or accelerator, etc.) from a human operator. However, the first vehicle 101 may include some data collectors 110 capable of providing collected data 115 for certain operations, e.g., maintaining a speed, whereupon certain operations, e.g., maintaining a speed, may be controlled by the autonomous driving module 106. In general, in the block 305, the first vehicle 101 may be operated in a partially autonomous mode, also sometimes referred to as a semi-autonomous mode (i.e., partially manual, fashion, where some operations, e.g., braking, could be manually controlled by a driver, while other operations, e.g., including steering, could be controlled by the computer 105. Likewise, the module 106 could control when a vehicle 101 changes lanes. However, it is further possible that additional vehicle 101 operations, e.g., steering, braking, speed, suspension control, etc., could be controlled by the module 106 in the computer 105, but the computer 105 in the first vehicle 101 lacks data 115 for performing such operations.

The first vehicle 101 generally transmits and receives, or at least listens for, messages 116 that may be received from one or more second vehicles 102 proximate to the first vehicle 101, e.g., second vehicles 102 that are close enough to the first vehicle 101 for reception of low power radio frequency transmissions or other transmissions by which messages 116 may be provided. Specific data elements included in a message 116 may be according to a known standard or protocol, such as DSRC, but also, as mentioned above, may include collected data 115 of a vehicle 101 not included in any current standard or protocol. For example, as discussed above, in addition to data 115 relating to position, speed, etc., a vehicle 101 may provide in a message 116 sensor data 115 such as radar, lidar, etc. data, images, sound, etc.

In any event, in a block 310 that follows the block 305, the computer 105 determines whether it has received one or more messages 116 from one or more second vehicles 101. If not, the process 300 returns to the block 305. Otherwise, the process 300 proceeds to a block 315.

In the block 315, the computer 105 analyzes the one or more messages 116 received from one or second more vehicles 101, 102 to determine whether a lead vehicle 102 can be identified. This is sometimes described as a vehicle 101 identifying a lead vehicle 102 for "latching." A lead vehicle 102, as mentioned above, is a second vehicle 101 that provides messages 116 to the first vehicle 101, where the messages 116 include data 115 collected by the first vehicle 101 that the computer 105 in the first vehicle 101 can use to conduct one or more autonomous operations, i.e., operate semi-autonomously using the data 115 provided by the second vehicle 101.

A lead vehicle 102 for latching may be identified according to a message 116 with specific content identifying the lead vehicle 102 as available to provide collected data 115 to one or more following vehicles 101. For example, a message 116 could identify a lead vehicle 102 as such and/or as a vehicle 101 that is able to obtain and transmit a set of collected data 115 sufficient for use by a following vehicle 101. Such message 116 could use one or more mechanisms, such as DSRC or possibly a wireless protocol such as IEEE 802.11 (popularly known as "WiFi"), cellular, or some RF (radio frequency) mechanism. A message 116 from a potential lead vehicle 102 could identify an autonomous mode or modes, e.g., full, partial, speed control, lane maintenance, etc., of the vehicle 102, as well as an identification of additional collected data 115 available from the vehicle 102 including data 115 that may not be available in the vehicle 101, e.g., positioning of vehicles 101 and objects 160 that are not equipped to provide messages 116. Alternatively or additionally, a following vehicle 101 could identify a lead vehicle 102 according to data 115 included in a message 116 from the lead vehicle 102, e.g., the lead vehicle 102 is transmitting collected data 115 that can be used by the following vehicle 101, such as data relating to speed, position, etc., of other vehicles 101, 102 and/or vehicles lacking capability for sending or receiving messages 116, roadway 155 objects 160, etc. If a lead vehicle 102 can be identified from the one or more second vehicles 101 providing messages 116, then the process 300 proceeds to a block 320. Otherwise, the process 300 returns to the block 310.

In the block 320, the computer 105 determines one or more autonomous operations that may be performed in the first vehicle 101 according to data 115 received from the lead vehicle 102. That is, an "autonomous operation" in the present context refers to an operation determined by the computer 105, and implemented according to instructions provided by the computer 105 to one or more controllers in a vehicle 101. For example, as mentioned above, the lead vehicle 101 could provide data 115 according to which the first vehicle 101 could identify an object 160 in a road 155, maintain a speed, maintain or changing lane, brake, accelerate, adjust a suspension in the vehicle 101 to accommodate a predicted roadway 155 surface, etc. Note that adjustments to braking and acceleration could be made based on a predicted roadway 115 friction and/or change thereto based on data 115 from a lead vehicle 102. Accordingly, in performing one or more autonomous operations based on data 115 received from the lead vehicle 102, the first (or following) vehicle 101 is operated semi-autonomously using the data 115 from the lead vehicle 101.

Use of data 115 from a lead vehicle 102 in a following vehicle 101 often depends on translating a position of the lead vehicle 102 to a position of the following vehicle 101. For example, a lead vehicle 102 may provide its geo-coordinates and trajectory information to the following vehicle 101, along with a distance of one or more objects 160, other vehicles 101, 102, etc., to the following vehicle 101. The computer 105 in the following vehicle 101 may then translate from the geo-coordinates and trajectory of the lead vehicle 102 to its own geo-coordinates and trajectory to determine a distance of the one or more objects 160, other vehicles 101, 102, etc., from the following vehicle 101.

In the block 325, following the block 320, the vehicle 101 operates at least in part according to the one or more autonomous operations selected in the block 320. In general, the vehicle 101 is operating semi-autonomously, and therefore requires some manual control by a human operator in addition to the one or more autonomous operations selected in the block 320. Further, as noted above, the computer 105 may be able to implement some autonomous operations without using data 115 from a lead vehicle 102, i.e., using data 115 from data collectors 110 in the first vehicle 101. For example, a lead vehicle 102 may provide information to a following vehicle 101 concerning an object 160 in a roadway 155 requiring high steering wheel torque to avoid, where the vehicle 101 does not include an ability to autonomously supply the required torque, the computer 105 could provide an alert message or the like to a vehicle 101 operator, e.g., via an HMI such as a screen, audio message, etc., to take manual control so that an evasive maneuver may be executed.

A block 330 follows the block 325. In the block 330, the computer 105 determines whether to continue using data 115 from the lead vehicle 101. For example, the lead vehicle 101 could stop providing messages 116 to the first vehicle 101, e.g., messaging could be deactivated, the lead vehicle 101 could exit a roadway on which the first vehicle 101 was continuing, etc. Alternatively, the computer 105 could determine that data 115 from the lead vehicle 101 was not of sufficient reliability for use. If the lead vehicle is to be retained, then the process 300 proceeds to a block 335. Otherwise, the process 300 proceeds to a block 340.

In the block 335, the first vehicle 101 continues to receive one or more messages from the lead vehicle 101. The process 300 then returns to the block 320, e.g., after a period of time, after a predetermined number of messages have been received, etc.

In the block 340, following the block 330, the computer 105 determines whether the process 300 should continue. For example, the process 300 may end if semi-autonomous driving operations end and a driver resumes full manual control, if the vehicle 101 is powered off, etc. In any case, if the process 300 should not continue, the process 300 ends following the block 340. Otherwise, the process 300 proceeds to the block 305.

CONCLUSION

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
   receiving, in a first vehicle, at least one message including data provided by a second vehicle;
   determining that the second vehicle data is from at least one of (a) a sensor of a type unavailable in the first vehicle and (b) a number of sensors greater than a number of sensors available in the first vehicle, thereby identifying the second vehicle as a lead vehicle, wherein the second vehicle data is to be processed by a first vehicle computer to operate the first vehicle; and
   after the second vehicle is identified as the lead vehicle, implementing at least one operation in the first vehicle according to the second vehicle data.

2. The method of claim 1, wherein the data includes data collected by one or more sensors in the second vehicle.

3. The method of claim 2, wherein the first vehicle lacks sensors to provide the data collected by one or more sensors in the second vehicle.

4. The method of claim 1, wherein the message data includes an identification of the second vehicle as a lead vehicle.

5. The method of claim 1, wherein the sensors in the second vehicle include at least one of a camera, a lidar sensor, and a radar sensor.

6. The method of claim 1, wherein the message is formatted in part according to a dedicated short range communications (DSRC) standard.

7. The method of claim 1, wherein the data included in the message includes a location of the second vehicle and a distance of the second vehicle from one of an object and a third vehicle.

8. The method of claim 7, further comprising using the location of the second vehicle and the distance of the second vehicle from one of an object and a third vehicle to determine a distance from the first vehicle of one of the object and the third vehicle.

9. The method of claim 1, wherein the at least one operation includes an autonomous operation that includes at least one of changing a speed of, adjusting a suspension of, and steering, the first vehicle.

10. The method of claim 1, wherein the at least one operation includes yielding to manual control of at least one function in the first vehicle, the method further comprising providing an alert via a human machine interface in the vehicle that the manual control is to be provided.

11. A system, comprising a computer in a vehicle, the computer comprising a processor and a memory, wherein the computer is programmed to:
    receive at least one message from a second vehicle, the message including data provided by the second vehicle;
    determining that the second vehicle data is from at least one of (a) a sensor of a type unavailable in the first vehicle and (b) a number of sensors greater than a number of sensors available in the first vehicle, thereby identifying the second vehicle as a lead vehicle; and
    after the second vehicle is identified as the lead vehicle, implement at least one operation in the first vehicle according to the data from the lead vehicle.

12. The system of claim 11, wherein the data includes data collected by one or more sensors in the second vehicle.

13. The system of claim 12, wherein the first vehicle lacks sensors to provide the data collected by one or more sensors in the second vehicle.

14. The system of claim 12, wherein the message data includes an identification that the second vehicle is a lead vehicle.

15. The system of claim 12, wherein the sensors in the second vehicle include at least one of a camera, a lidar sensor, and a radar sensor.

16. The system of claim 12, wherein the message is formatted in part according to a dedicated short range communications (DSRC) standard.

17. The system of claim 12, wherein the data included in the message includes a location of the second vehicle and a distance of the second vehicle from at least one of an object and a third vehicle.

18. The system of claim 17, further comprising using the location of the second vehicle and the distance of the second vehicle from one of an object and a third vehicle to determine a distance from the first vehicle of one of the object and the third vehicle.

19. The system of claim 12, wherein the at least one operation includes an autonomous operation that includes at least one of changing a speed of, adjusting a suspension of, and steering the first vehicle.

20. The system of claim 12, wherein the at least one operation includes yielding to manual control of at least one function in the first vehicle, the method further comprising providing an alert via a human machine interface in the vehicle that the manual control is to be provided.

\* \* \* \* \*